Figures 1, 2:
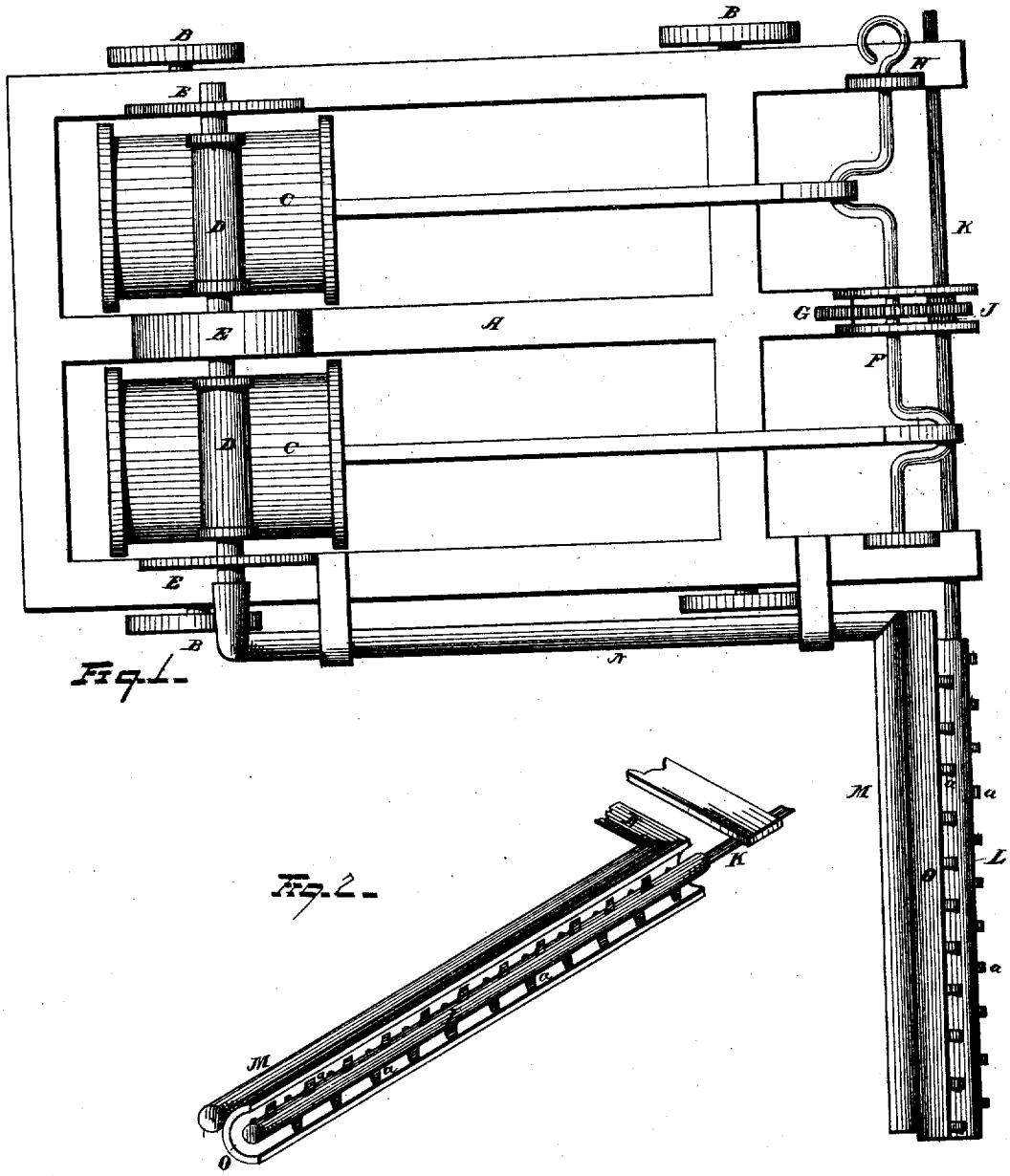

P. SHELDON.

APPARATUS FOR MINING COAL.

Reissued May 23, 1876.

No. 7,135.

WITNESSES

E. C. Stillingham

Albert H. Bright

By

INVENTOR

Porter Sheldon,

By Leggett & Leggett,

Att'orney

N. PETERS, PHOTO-LITHOGRAPHER, WASHINGTON, D. C.

UNITED STATES PATENT OFFICE.

PORTER SHELDON, OF JAMESTOWN, NEW YORK.

IMPROVEMENT IN APPARATUS FOR MINING COAL.

Specification forming part of Letters Patent No. 155,593, dated October 6, 1874; reissue No. 7,135, dated May 23, 1876; application filed May 1, 1876.

*To all whom it may concern:*

Be it known that I, PORTER SHELDON, of Jamestown, in the county of Chautauqua and State of New York, have invented certain new and useful Improvements in Apparatus for Mining Coal; and I do hereby declare the following to be a full, clear, and exact description of the invention, such as will enable others skilled in the art to which it pertains to make and use it, reference being had to the accompanying drawings, which form part of this specification.

In the drawings, Figure 1 is a plan view of my machine, and Fig. 2 is a perspective view of the cutter and blower.

This invention relates to that class of cutters that are moved through the galleries of a mine and cut along the breast of coal, operated by compressed air.

My invention consists, first, in the combination, with the blower, of a pipe or tube leading to the exhaust-port or opening of one or more engines, whereby the exhaust air of the engines is utilized to displace the cuttings formed by the rotary cutter; second, in the combination, with a rotary cutter, of a blower extending nearly the length of the cutter, to remove the cuttings the entire length of the same; third, in the combination, with the rotary cutter and blower, of a deflector interposed between the blower and cutter, to confine and direct the air against the cuttings formed by the rotary cutter.

A represents the frame of the machine, and B the wheels supporting the same. C C are oscillating engines, having their trunnions D suitably journaled in bearing-blocks E, attached to frame A. To the forward end of the frame A the double crank-shaft F, carrying the driving-gear G, is journaled in bearing-blocks H, and said crank-shaft is actuated by the pistons of the oscillating engines. The driving-gear G meshes with a cog-wheel, J, secured to a shaft, K, journaled in the ends of the side rails of the main frame A. L is a rotary cutter, preferably constructed of steel, and is provided with one or more rows of cutting points, *a*, set at right angles to the axis of the cutter, and secured to the same by set-screws or other suitable device. The cutting-points are arranged in rows relative to each other, so that the several points of one row shall intersect the cutting-points of the adjacent row, thereby insuring a uniform and continuous cutting-face for the whole length of the cutting-bar. The rotary cutter L is removably secured to the end of the rotary shaft K, and moves in unison therewith. Immediately in rear of the rotary cutter L the blower M is arranged, said blower consisting of a tube of about the same length of the cutter, and provided with any number of perforations adjacent to the cutter. A pipe or tube, N, connects the inner or open end of the blower M with the exhaust-trunnion of the oscillating engine, whereby the exhaust air flows from the engine into the blower M, and from thence issues in jets against the rotary cutter, and the channel in the coal formed, thereby effectually removing the cuttings from about the cutter and from the channel, and allowing of its free operation against the surface of the coal to be cut. That the air issuing from the blower may be deflected against the cutter and cuttings formed thereby, and also that it may be confined to maintain a current to remove the cuttings from about the cutter, a guard or deflector, O, formed of sheet metal, and suitably perforated, is attached to the blower M, between the rotary cutter and the same, said deflector being formed of sufficient size to allow of the rotation of the cutting-points within the same.

The machine thus constructed is moved through the galleries of the mine along the breast of coal, and cuts a horizontal channel of the width and length of the rotary cutter, while the coal-cuttings are effectually removed from about the cutter and from the channel by the exhaust air of the engines.

Having fully described my invention, what I claim as new, and desire to secure by Letters Patent, is—

1. In a coal-mining machine, the combination with the blower, for removing cuttings from about the cutter, of a pipe leading to the exhaust of an engine, substantially as and for the purpose specified.

2. The combination, with a cutter, of an independent blower, extending nearly the length of the cutter, substantially as and for the purpose specified.

3. The combination, with a rotary cutter and blower, of a deflector interposed between said cutter and blower, substantially as and for the purpose specified.

In testimony that I claim the foregoing I have hereunto set my hand this 13th day of April, 1876.

PORTER SHELDON.

Witnesses:
JAMES I. FOWLER,
JEROME B. FISHER, Jr.